(12) United States Patent
Grayson et al.

(10) Patent No.: US 10,911,475 B2
(45) Date of Patent: *Feb. 2, 2021

(54) IDENTIFYING ANOMALIES IN A NETWORK

(71) Applicant: Cisco Technology, Inc., San Jose, CA (US)

(72) Inventors: Mark Grayson, Berkshirem (GB); Santosh Ramrao Patil, Santa Clara, CA (US); Gangadharan Byju Pularikkal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,564

(22) Filed: Jun. 7, 2019

(65) Prior Publication Data

US 2019/0289028 A1 Sep. 19, 2019

Related U.S. Application Data

(63) Continuation of application No. 15/795,670, filed on Oct. 27, 2017, now Pat. No. 10,375,100.

(51) Int. Cl.
*H04W 24/00* (2009.01)
*H04L 29/06* (2006.01)
(Continued)

(52) U.S. Cl.
CPC ...... *H04L 63/1425* (2013.01); *H04L 63/1416* (2013.01); *H04W 12/12* (2013.01);
(Continued)

(58) Field of Classification Search
CPC .................................................. H04L 63/1425
See application file for complete search history.

(56) References Cited

U.S. PATENT DOCUMENTS 9,298,494 B2 3/2016 Gathala et al.
9,369,476 B2 6/2016 Chekina et al.
(Continued)

FOREIGN PATENT DOCUMENTS

CN 102448066 A 5/2012

OTHER PUBLICATIONS

JP Vasseur, PhD, et al., "Securing Your Network with Anomaly Detection using Distributed Learning Architecture (Learning Networks)", BRKSEC-3056, https://www.cisco.com/c/dam/.../ciscoknowledgenetwork/...Techad-SLN-Jan2017.pdf, Jan. 2017, 39 pages.

(Continued)

*Primary Examiner* — Josnel Jeudy

(57) ABSTRACT

Various implementations disclosed herein enable identifying anomalies in a network. For example, in various implementations, a method of identifying anomalies in a network is performed by a network node. In various implementations, the network node includes one or more processors, and a non-transitory memory. In various implementations, the method includes generating a characteristic indicator that characterizes a device type based on communications associated with a first device of the device type. In various implementations, the method includes determining, based on communications associated with the first device, a performance indicator that indicates a performance of the first device. In various implementations, the method includes synthesizing an anomaly indicator as a function of the performance indicator in relation to the characteristic indicator.

20 Claims, 6 Drawing Sheets

(51) Int. Cl.
*H04W 12/12* (2009.01)
*H04W 24/04* (2009.01)
*H04W 76/27* (2018.01)
*H04W 24/08* (2009.01)

(52) U.S. Cl.
CPC ........... *H04W 24/00* (2013.01); *H04W 24/04* (2013.01); *H04W 24/08* (2013.01); *H04W 76/27* (2018.02)

(56) References Cited

U.S. PATENT DOCUMENTS

| | | | |
|---|---|---|---|
| 9,472,084 | B1 | 10/2016 | Barak et al. |
| 9,705,762 | B2 | 7/2017 | Parthasarathy et al. |
| 2004/0025044 | A1 | 2/2004 | Day |
| 2005/0027818 | A1 | 2/2005 | Friedman et al. |
| 2005/0185666 | A1 | 8/2005 | Raya et al. |
| 2007/0143851 | A1 | 6/2007 | Nicodemus et al. |
| 2010/0197315 | A1 | 8/2010 | Lindstroem et al. |
| 2011/0125989 | A1 | 5/2011 | Amidon et al. |
| 2013/0276125 | A1 | 10/2013 | Bailey |
| 2014/0244552 | A1 | 8/2014 | Liu et al. |
| 2015/0163121 | A1 | 6/2015 | Mahaffey et al. |
| 2015/0201424 | A1 | 7/2015 | Lin et al. |
| 2016/0036844 | A1 | 2/2016 | Kopp et al. |
| 2017/0063656 | A1 | 3/2017 | Vidyarthi et al. |
| 2017/0099309 | A1 | 4/2017 | Di Pietro et al. |
| 2017/0155566 | A1 | 6/2017 | Martinsen et al. |
| 2018/0359095 | A1 | 12/2018 | Asati et al. |

OTHER PUBLICATIONS

JP Vassuer, PhD, et al., "Threat Detection and Mitigation for IoT Systems using Self Learning Networks (SLN)", https://docbox.etsi.org/...MITIGATINGMECHANISMS/CISCO_SEEWALD.pdf, Jun. 2016, 13 pages.

JP Vasseur, PhD, "Internet Behavioral Analytics (IBA) using Self Learning Networks", BRKSEC-3056, https://webcache.googleusercontent.com/search?q=cache:WNxEg4CqcIMJ:https://technodocbox.com/Network_Security/72441466-Internet-behavioral-analytics-iba-using-self-learning-networks-jp-vasseur-phd-cisco-fellow-brksec-3056.html+&cd=2&hl=en&ct=clnk&gl=us&client=firefox-b-1, Jun. 2015, Cisco live!, 60 pages.

IDENTIFYING ANOMALIES IN A NETWORK

CROSS-REFERENCE TO RELATED APPLICATION

This application is a continuation of and claims benefit to U.S. patent application Ser. No. 15/795,670, filed Oct. 27, 2017, the entire contents of which are incorporated herein by reference.

TECHNICAL FIELD

The present disclosure relates generally to networks, and in particular, to identifying anomalies in a network.

BACKGROUND

The number of devices that are connected to networks has increased exponentially in recent years. As deployment of the Internet of things (IoT) advances, the number of network-connected devices will further increase. Some networks are susceptible to security attacks via the devices that are part of the network. As the number of devices in a network increase, the network often becomes more vulnerable to security attacks. Furthermore, some IoT devices lack hardware and/or software capability to prevent or thwart security attacks. Given the various device types that are currently connected to networks and additional device types that will likely connect to networks in the future, networks that rely heavily on static rules for security protection often fail at identify anomalies.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
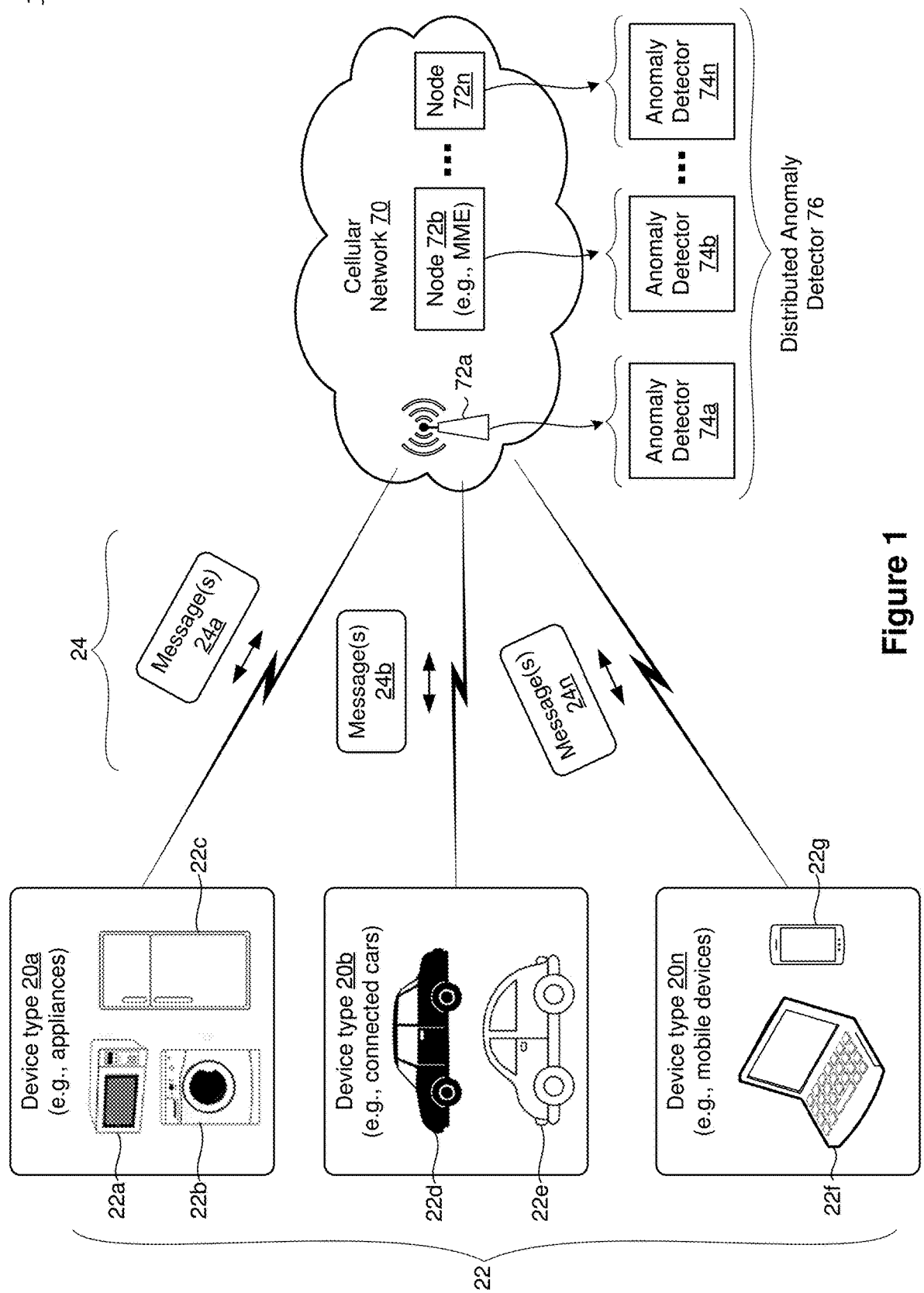
FIG. 1 is a schematic diagram of a network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable identifying anomalies in a network. For example, in various implementations, a method of identifying anomalies in a network is performed by a network node. In various implementations, the network node includes one or more processors, and a non-transitory memory. In various implementations, the method includes generating a characteristic indicator that characterizes a device type based on communications associated with a first device of the device type. In various implementations, the method includes determining, based on communications associated with the first device, a performance indicator that indicates a performance of the first device. In various implementations, the method includes synthesizing an anomaly indicator as a function of the performance indicator in relation to the characteristic indicator.

Example Embodiments

FIG. 1 is a schematic diagram of a network environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 10 includes devices 22 of various device types 20a, 20b . . . 20n, and a cellular network 70 with various cellular network nodes 72a, 72b . . . 72n. In some implementations, the cellular network nodes 72a, 72b . . . 72n include corresponding anomaly detectors 74a, 74b . . . 74n. In some implementations, the anomaly detectors 74a, 74b . . . 74n, individually or in combination, detect anomalies in the cellular network 70. For example, in some implementations, the anomaly detectors 74a, 74b . . . 74n, individually or in combination, identify devices 22 that exhibit anomalous behavior. In some implementations, the anomaly detectors 74a, 74b . . . 74n protect the cellular network 70 from security threats by detecting anomalies. For example, in some implementations, the anomaly detectors 74a, 74b . . . 74n prevent and/or thwart security attacks on the cellular network nodes 72a, 72b . . . 72n by devices 22 that are malicious. In some implementations, the anomaly detectors 74a, 74b . . . 74n collectively form a distributed anomaly detector 76. In some implementations, the anomaly detectors 74a, 74b . . . 74n are collectively referred to as the distributed anomaly detector 76.

In various implementations, the cellular network 70 operates in accordance with 3GPP standards. For example, in some implementations, the cellular network 70 includes a fifth-generation (5G) cellular network. In various implementations, the cellular network nodes 72a, 72b . . . 72n perform various cellular-related functions. In some implementations, at least some of the cellular network nodes 72a, 72b . . . 72n form the core network architecture for the cellular network 70 (e.g., as defined by the 3GPP standards). In some implementations, at least some of the cellular network nodes 72a, 72b . . . 72n form the Evolved Packet Core (EPC) portion of the cellular network 70. In some implementations, the cellular network node 72a includes a base station (e.g., an eNode B (eNB)) that provides the devices 22 access to the cellular network 70. In some implementations, the cellular network node 72b includes a Mobility Management Entity (MME) that serves as a signaling node in the cellular network 70. For example, in some implementations, as the MME, the cellular network node 72b initiates paging and authentication of the devices 22.

In various implementations, one or more of the anomaly detectors 74a, 74b . . . 74n identifies anomalies in the cellular network 70. Briefly, in various implementations, one or more of the anomaly detectors 74a, 74b . . . 74n identifies anomalies by grouping the devices 22 into the device types 20a, 20b . . . 20n, generating corresponding characteristic indicators for the device types 20a, 20b . . . 20n, determining corresponding performance indicators for the devices 22, and synthesizing an anomaly indicator based on the performance indicators and the characteristic indicators.

In various implementations, one or more of the anomaly detectors 74a, 74b . . . 74n groups the devices 22 into the device types 20a, 20b . . . 20n based on one or more characteristics of the devices 22. For example, in some implementations, one or more of the anomaly detectors 74a, 74b . . . 74n groups the devices 22 into the device types 20a, 20b . . . 20n based on functions of the devices 22, identifiers of the devices 22 (e.g., IMEI of the devices 22), and/or classmarks of the devices 22. In the example of FIG. 1, the device type 20a includes devices 22 that are appliances (e.g., microwave 22a, washing machine 22b, refrigerator 22c, stoves, ovens, air conditioners, etc.). In the example of FIG. 1, the device type 20b includes devices 22 that are vehicles (e.g., automobiles 22d and 22e, trains, airplanes, ships, etc.). In the example of FIG. 1, the device type 20c includes devices 22 that are communication devices (e.g., mobile devices such as laptop 22f and smartphone 22g). In some implementations, the device types 20a, 20b . . . 20n indicate operational characteristics of corresponding devices 22. In the example of FIG. 1, since the device type 20a includes appliances that are typically immobile, the device type 20a corresponds to no/low mobility devices. In the example of FIG. 1, since the device type 20n includes communication devices such as the smartphone 22g that can be taken across continents, the device type 20n corresponds to high mobility devices.

In various implementations, one or more of the anomaly detectors 74a, 74b . . . 74n generates the corresponding characteristic indicators for the device types 20a, 20b . . . 20n based on messages 24 communicated by the devices 22. For example, in some implementations, one or more of the anomaly detectors 74a, 74b . . . 74n generates a characteristic indicator for the device type 20a based on messages 24a communicated by the microwave 22a, the washing machine 22b and/or the refrigerator 22c. In some implementations, one or more of the anomaly detectors 74a, 74b . . . 74n generates a characteristic indicator for the device type 20b based on messages 24b communicated by the automobile 22d and/or the automobile 22e. In some implementations, one or more of the anomaly detectors 74a, 74b . . . 74n generates a characteristic indicator for the device type 20n based on messages 24n communicated by the laptop 22f and/or the smartphone 22g. In some implementations, the characteristic indicators define thresholds for mobility, data throughput, types of messages communicated and/or number/frequency of messages communicated.

In various implementations, one or more of the anomaly detectors 74a, 74b . . . 74n generates the corresponding performance indicators for the devices 22 based on the messages 24 communicated by the devices 22. In some implementations, the performance indicators indicate respective performances of the devices 22. In some implementations, the performance indicators indicate the mobility of the devices 22. In some implementations, the performance indicators indicate the data throughput of the devices 22. In some implementations, the performance indicators indicate the messages (e.g., a number of messages and/or a type of messages) communicated by the devices 22.

In various implementations, one or more of the anomaly detectors 74a, 74b . . . 74n synthesize an anomaly indicator based on the characteristic indicator(s) and the performance indicator(s). In some implementations, one or more of the anomaly detectors 74a, 74b . . . 74n synthesize the anomaly indicator in response to the performance indicator(s) breaching the characteristic indicator(s). For example, in some implementations, one or more of the anomaly detectors 74a, 74b . . . 74n synthesize the anomaly indicator in response to a difference between the performance indicator(s) and the characteristic indicator(s) being greater than a threshold. More generally, in various implementations, one or more of the anomaly detectors 74a, 74b . . . 74n identify an anomaly based on the characteristic indicator(s) and the performance indicator(s), and synthesize the anomaly indicator in response to identifying the anomaly.

In some implementations, one or more of the anomaly detectors 74a, 74b . . . 74n transmit the anomaly indicator to one of the devices 22 whose performance indicator breaches the characteristic indicator of the device type. In some implementations, one or more of the anomaly detectors 74a, 74b . . . 74n transmit the anomaly indicator to a network administration device in order to identify one of the devices 22 whose performance indicator breaches the characteristic indicator of the device type. In some implementations, one or more of the anomaly detectors 74a, 74b . . . 74n transmit a command that limits an operation of at least one of the devices 22 whose performance indicator breaches the characteristic indicator of the device type (e.g., by deactivating the device, powering-down the device and/or quarantining the device).

In various implementations, the devices 22 includes transmitters and/or receivers (e.g., transceivers) that allow the devices 22 to communicate with the cellular network 70. In some implementations, the devices 22 communicate with the cellular network 70 periodically (e.g., once a day, once a month, etc.). In some implementations, the devices 22 utilize a low power mode to communicate with the cellular network 70 (e.g., in order to conserve power). In various implementations, the messages 24 communicated between the devices 22 and the cellular network 70 include network layer messages. For example, in some implementations, the messages 24 communicated between the devices 22 and the cellular network 70 include non-access stratum (NAS) messages (e.g., update messages, attach messages, authentication messages, service requests, etc.). In some implementations, the messages 24 communicated between the devices 22 and the cellular network 70 include radio resource control (RRC) messages (e.g., messages related to connection establishment, connection release, broadcast of system information, radio bearer establishment, reconfiguration, etc.). In some implementations, at least a portion of the messages 24 are transported by a protocol that operates below the Internet Protocol (IP) layer thereby circumventing security protections available at the IP layer. In various implementations, the methods, devices and/or systems discussed herein for anomaly detection operate at a layer below the IP layer (e.g., at the network layer) thereby providing security protection from the portion of messages 24 that are transported by protocols operating below the IP layer.

In various implementations, one or more of the anomaly detectors 74a, 74b . . . 74n detect anomalous NAS messages and/or anomalous RRC messages communicated by the devices 22. In some implementations, detecting anomalous NAS messages and/or anomalous RRC messages allows the anomaly detector(s) 74a, 74b . . . 74n to prevent and/or thwart security attacks on the cellular network 70. For example, in some implementations, in response to detecting anomalous NAS messages and/or anomalous RRC messages being communicated by a particular device 22, the anomaly detector(s) 74a, 74b . . . 74n limit an operation of that particular device 22 to reduce (e.g., stop) the anomalous NAS/RRC messages. In various implementations, reducing the anomalous NAS/RRC messages conserves resources of the cellular network 70 that would otherwise be utilized in processing the anomalous NAS/RRC messages. In various implementations, the anomaly detector(s) 74a, 74b . . . 74n improve the operability of the cellular network 70 by detecting anomalous messages and forgoing processing of the anomalous messages thereby conserving resources (e.g., processing resources of the cellular network 70) and improving the efficiency of the cellular network 70. In some implementations, anomalous messages interrupt the operation of the cellular network 70. As such, detecting anomalies and reducing the anomalous messages improves the operation of the cellular network 70 by increasing availability of the cellular network 70.

Figure 2:
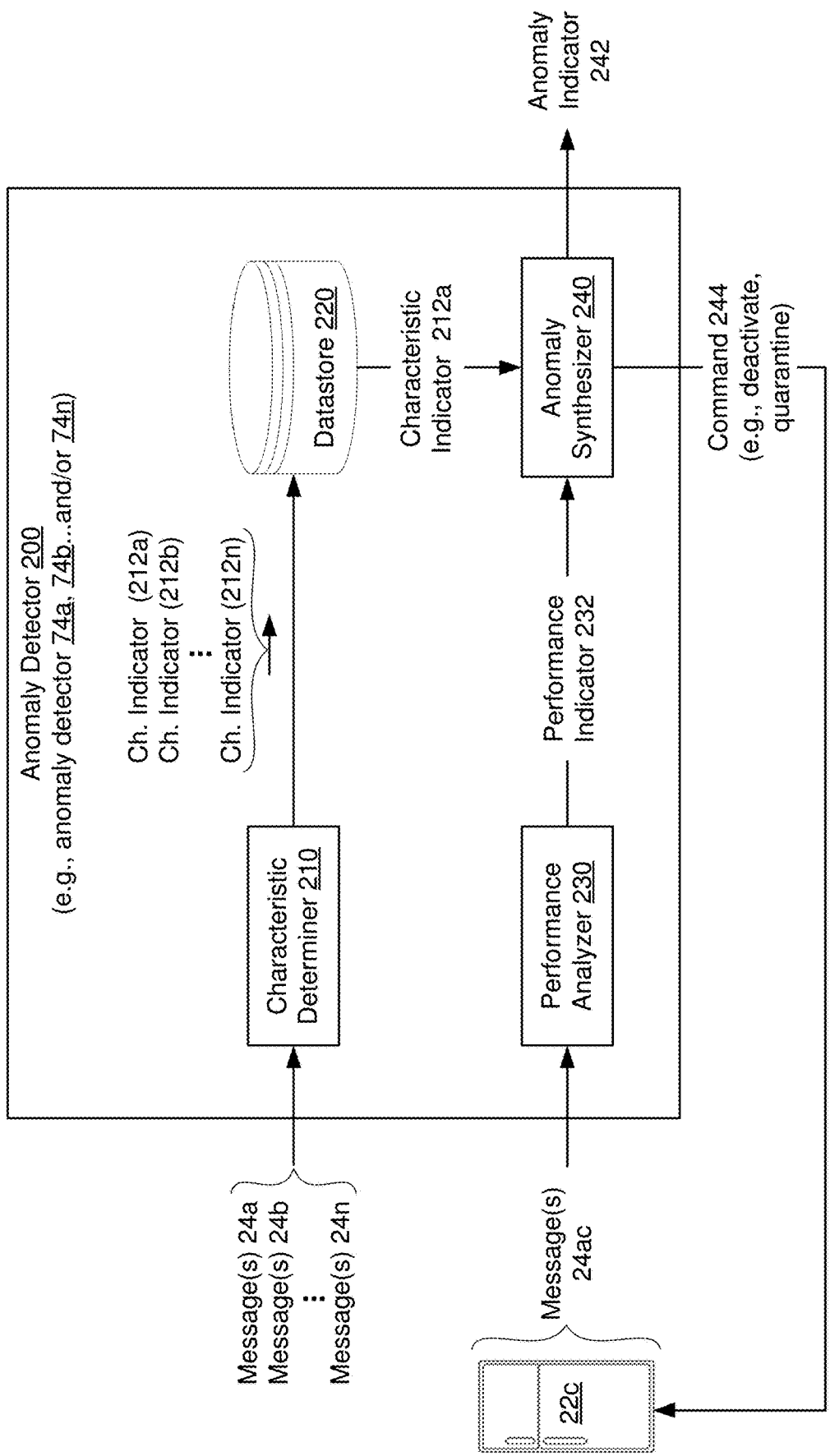
FIG. 2 is a block diagram of an anomaly detector in accordance with some implementations.

FIG. 2 illustrates a block diagram of an anomaly detector 200 (e.g., the anomaly detectors 74a, 74b . . . and/or 74n). In some implementations, the anomaly detector 200 includes a characteristic determiner 210, a datastore 220, a performance analyzer 230, and an anomaly synthesizer 240. Briefly, in various implementations, the characteristic determiner 210 determines (e.g., generates) corresponding characteristic indicators 212a, 212b . . . 212n for the device types 20a, 20b . . . 20n based on the messages 24a, 24b . . . 24n, the performance analyzer 230 generates a performance indicator 232 that indicates the performance of at least one of the devices 22, and the anomaly synthesizer 240 synthesizes an anomaly indicator 242 based on the performance indicator 232 and the characteristic indicators 212a, 212b . . . 212n.

In various implementations, the characteristic determiner 210 determines corresponding characteristic indicators 212a, 212b . . . 212n for the device types 20a, 20b . . . 20n based on the messages 24a, 24b . . . 24n, respectively. For example, in some implementations, the characteristic determiner 210 determines the characteristic indicator 212a for the device type 24a based on the messages 24a communicated by at least one of the devices of the device type 24a. For example, the characteristic determiner 210 determines the characteristic indicator 212a for the device type 24a based on the messages 24a communicated by the microwave 22a, the washing machine 22b and/or the refrigerator 22c. Similarly, in some implementations, the characteristic determiner 210 determines the characteristic indicator 212b for the device type 20b based on the messages 24b communicated by at least one of the devices of the device type 20b. For example, the characteristic determiner 210 determines the characteristic indicator 212b for the device type 20b based on the messages 24b communicated by the automobile 22d and/or the automobile 22e. Similarly, in some implementations, the characteristic determiner 210 determines the characteristic indicator 212n for the device type 20n based on the messages 24n communicated by at least one of the devices of the device type 20n. For example, the characteristic determiner 210 determines the characteristic indicator 212n for the device type 20n based on the messages 24n communicated by the laptop 22f and/or the smartphone 22g.

In various implementations, the characteristic indicators 212a, 212b . . . 212n include alphanumeric values. For example, in some implementations, the characteristic indicators 212a, 212b . . . 212n include numerical values. In some implementations, the characteristic indicators 212a, 212b . . . 212n include labels. In some implementations, the characteristic indicators 212a, 212b . . . 212n include flags (e.g., binary values including 1 and 0).

In some implementations, the characteristic determiner 210 determines the corresponding characteristic indicators 212a, 212b . . . 212n for the device types 20a, 20b . . . 20n based on a function of individual characteristic indicators of devices in the device types 20a, 20b . . . 20n. For example, in some implementations, the characteristic determiner 210 determines the characteristic indicator 212a for the device type 20a based on a function of individual characteristic indicators of devices of the device type 20a. As an example, the characteristic determiner 210 determines the characteristic indicator 212a for the device type 20a based on a function of a characteristic indicator of the microwave 22a, a characteristic indicator of the washing machine 22b, and a characteristic indicator of the refrigerator 22c. In some implementations, the characteristic indicator 212a for the device type 20a is an average of the characteristic indicator of the microwave 22a, the characteristic indicator of the washing machine 22b, and the characteristic indicator of the refrigerator 22c. In some implementations, the characteristic indicator 212a for the device type 20a is a mean of the characteristic indicator of the microwave 22a, the characteristic indicator of the washing machine 22b, and the characteristic indicator of the refrigerator 22c.

In various implementations, the characteristic indicators 212a, 212b . . . 212n indicate a target operation (e.g., an expected operation) for devices of the device types 20a, 20b . . . 20n, respectively. In various implementations, the characteristic indicators 212a, 212b . . . 212n indicate a target performance (e.g., an expected performance) for devices of the device types 20a, 20b . . . 20n, respectively. In various implementations, the characteristic indicators 212a, 212b . . . 212n indicate a target number of communications and/or a target type of communications (e.g., an expected number of communications and/or an expected type of communications) for devices of the device types 20a, 20b . . . 20n, respectively.

In some implementations, the characteristic indicators 212a, 212b . . . 212n indicate target mobility levels (e.g., mobility thresholds) for devices of the device types 20a, 20b . . . 20n, respectively. For example, in some implementations, the characteristic indicators 212a, 212b . . . 212n indicate how much the devices of the device types 20a, 20b . . . 20n, respectively, are expected to move. In some implementations, the target mobility levels defined by the characteristic indicators 212a, 212b . . . 212n are based on a function of (e.g., an average of, or a mean of) individual characteristic indicators of devices of the device types 20a, 20b . . . 20n, respectively. For example, in some implementations, the target mobility level defined by the characteristic indicator 212a for the device type 20a is a function of (e.g., an average of, or a mean of) mobility levels of the devices of the device type 20a (e.g., the microwave 22a, the washing machine 22b and the refrigerator 22c shown in FIG. 1). In the example of FIG. 1, the device type 20a includes appliances that are typically immobile. As such, in some implementations, the characteristic indicator 212a indicates that the target mobility level for the device type 20a is no mobility or low mobility (e.g., exactly zero, or approximately zero).

In some implementations, the characteristic indicators 212a, 212b . . . 212n indicate target data throughputs (e.g., data throughput thresholds) for devices of the device types 20a, 20b . . . 20n, respectively. For example, in some implementations, the characteristic indicators 212a, 212b . . . 212n indicate how much data the devices of the device types 20a, 20b . . . 20n, respectively, are expected to receive/transmit. In some implementations, the target data throughputs defined by the characteristic indicators 212a, 212b . . . 212n are based on a function of (e.g., an average of, or a mean of) individual data throughputs of devices of the device types 20a, 20b . . . 20n, respectively. For example, in some implementations, the target data throughput defined by the characteristic indicator 212a for the device type 20a is a function of (e.g., an average of, or a mean of) data throughputs of the devices of the device type 20a (e.g., the microwave 22a, the washing machine 22b and the refrigerator 22c shown in FIG. 1). In the example of FIG. 1, the device type 20a includes appliances that typically do not receive/transmit a significant amount of data. As such, in some implementations, the characteristic indicator 212a indicates that the target data throughput for the device type 20a is relatively low (e.g., less than 1 MB/day, less than 3 MB/week, less than 10 MB/month, etc.).

In some implementations, the characteristic indicators 212a, 212b . . . 212n indicate a target communication type (e.g., an expected communication type) for devices of the device types 20a, 20b . . . 20n, respectively. In some implementations, the target communication type indicates types of communications that are not permitted/expected. For example, in some implementations, the characteristic indicators 212a, 212b . . . 212n indicate a type of messages that devices of the device types 20a, 20b . . . 20n, respectively, are expected to receive/transmit. In some implementations, the target communication type defined by the characteristic indicators 212a, 212b . . . 212n is based on individual communication types of devices of the device types 20a, 20b . . . 20n, respectively. For example, in some implementations, the target communication type defined by the characteristic indicator 212a for the device type 20a includes types of messages that are communicated by at least a portion of the devices of the device type 20a (e.g., the microwave 22a, the washing machine 22b and/or the refrigerator 22c shown in FIG. 1). In the example of FIG. 1, the device type 20a includes appliances that typically do not communicate messages related to cell handover. As such, in some implementations, the characteristic indicator 212a indicates that the target communication type for the device type 20a excludes cell handover messages.

In some implementations, the characteristic indicators 212a, 212b . . . 212n indicate a target number/frequency of communications (e.g., communication number/frequency threshold) for devices of the device types 20a, 20b . . . 20n, respectively. For example, in some implementations, the characteristic indicators 212a, 212b . . . 212n indicate a number/frequency of messages that devices of the device types 20a, 20b . . . 20n, respectively, are expected to receive/transmit. In some implementations, the target number/frequency of communications defined by the characteristic indicators 212a, 212b . . . 212n is based on individual number/frequency of communications by devices of the device types 20a, 20b . . . 20n, respectively. For example, in some implementations, the target number/frequency of communications defined by the characteristic indicator 212a for the device type 20a is a function of (e.g., an average of, or a mean of) the number/frequency of communications by at least a portion of the devices of the device type 20a (e.g., the microwave 22a, the washing machine 22b and/or the refrigerator 22c shown in FIG. 1). In the example of FIG. 1, the device type 20a includes appliances that typically do not communicate messages often. As such, in some implementations, the characteristic indicator 212a indicates that the target number/frequency of communications for the device type 20a is less than one message per hour, one message per day, ten messages per month, etc.

In some implementations, the characteristic indicators 212a, 212b . . . 212n indicate a target direction of communication (e.g., an expected direction of communication) for devices of the device types 20a, 20b . . . 20n, respectively. In some implementations, the target direction of communication indicates whether a majority of the communications (e.g., all the communications) are incoming (e.g., messages received) or outgoing (e.g., messages transmitted). For example, in some implementations, the characteristic indicators 212a, 212b . . . 212n indicate whether the devices of the device types 20a, 20b . . . 20n, respectively, are expected to receive or transmit data (e.g., messages). In some implementations, the target direction of communication defined by the characteristic indicators 212a, 212b . . . 212n is based on individual directions of communication of devices of the device types 20a, 20b . . . 20n, respectively. For example, in some implementations, the target direction of communication defined by the characteristic indicator 212a for the device type 20a is based on the directions of communication of at least a portion of the devices of the device type 20a (e.g., the microwave 22a, the washing machine 22b and/or the refrigerator 22c shown in FIG. 1). In some implementations, the target direction of communication includes a ratio of incoming and outgoing data. In the example of FIG. 1, the device type 20a includes appliances that typically do not request significant amounts of data. As such, in some implementations, the characteristic indicator 212a indicates that the target direction of communication for the device type 20a is predominantly outgoing (e.g., 90% outgoing and 10% incoming).

In various implementations, the characteristic determiner 210 generates the characteristic indicators 212a, 212b . . . 212n periodically (e.g., once a day, once a week, once a month, etc.). In some implementations, the characteristic determiner 210 generates the characteristic indicators 212a, 212b . . . 212n in response to a threshold change in the number/percentage of devices 22. For example, in some implementations, the characteristic determiner 210 generates the characteristic indicator 212a for the device type 20a in response to a threshold number/percentage of new devices of device type 20a being initialized. In some implementations, the characteristic determiner 210 generates the characteristic indicator 212a for the device type 20a in response to a threshold number/percentage of existing devices of device type 20a being deactivated/decommissioned.

In some implementations, the characteristic determiner 210 updates the characteristic indicators 212a, 212b . . . 212n after generating the characteristic indicators 212a, 212b . . . 212n. For example, in some implementations, the characteristic determiner 210 updates the characteristic indicators 212a, 212b . . . 212n based on additional messages communicated by the devices 22.

In various implementations, the characteristic determiner 210 utilizes devices, methods and/or systems associated with machine learning to generate the characteristic indicators 212a, 212b . . . 212n. For example, in some implementations, the characteristic determiner 210 utilizes a learning agent to generate the characteristic indicators 212a, 212b . . . 212n. In various implementations, the characteristic determiner 210 generates the characteristic indicators 212a, 212b . . . 212n automatically (e.g., without human intervention, for example, without a sequence of user inputs).

In various implementations, the characteristic determiner 210 stores the characteristic indicators 212a, 212b . . . 212n in the datastore 220.

In various implementations, the performance analyzer 230 generates a performance indicator 232 that indicates a performance of at least one of the devices 22. In the example of FIG. 2, the performance indicator 232 indicates a performance of the refrigerator 22c. As shown in FIG. 2, the performance indicator 232 for the refrigerator 22c is based on messages 24ac communicated (e.g., transmitted and/or received) by the refrigerator 22c.

In various implementations, the performance indicator 232 indicates a mobility level of the refrigerator 22c. In some implementations, the performance indicator 232 indicates a data throughput of the refrigerator 22c. For example, in some implementations, the performance indicator 232 indicates an amount of data that the refrigerator 22c is receiving/transmitting. In some implementations, the performance indicator 232 indicates a type of communication associated with the refrigerator 22c. For example, in some implementations, the performance indicator 232 indicates whether the refrigerator 22c is communicating messages related to cell handovers. In some implementations, the performance indicator 232 indicates a number/frequency of communications associated with the refrigerator 22c. For example, in some implementations, the performance indicator 232 indicates a number of messages being transmitted/received by the refrigerator 22c. In some implementations, the performance indicator 232 indicates a direction of communication associated with the refrigerator 22c. For example, in some implementations, the performance indicator 232 indicates whether the refrigerator 22c is predominantly receiving data or transmitting data. In some implementations, the performance indicator 232 indicates a ratio of messages being transmitted and received by the refrigerator 22c. In various implementations, the performance analyzer 230 provides the performance indicator 232 to the anomaly synthesizer 240.

In various implementations, the anomaly synthesizer 240 synthesizes an anomaly indicator 242 based on the performance indicator 232 and a corresponding one of the characteristic indicators 212a, 212b . . . 212n. In the example of FIG. 2, since the refrigerator 22c is of device type 20a, the anomaly synthesizer 240 retrieves the characteristic indicator 212a for the device type 20a. As illustrated in FIG. 2, the anomaly synthesizer 240 synthesizes the anomaly indicator 242 based on the performance indicator 232 and the characteristic indicator 212a. In various implementations, the anomaly indicator 242 indicates that there is an anomaly at one of the devices 22 (e.g., at the refrigerator 22c).

In various implementations, the anomaly synthesizer 240 synthesizes the anomaly indicator 242 in response to the performance indicator 232 breaching a function of the characteristic indicator 212a. For example, in some implementations, the anomaly synthesizer 240 synthesizes the anomaly indicator 242 in response to a difference between the performance indicator 232 and the characteristic indicator 212a being greater than a threshold. In some implementations, the anomaly synthesizer 240 synthesizes the anomaly indicator 242 in response to the performance indicator 232 being greater than the characteristic indicator 212a.

In some implementations, the anomaly synthesizer 240 synthesizes the anomaly indicator 242 in response to a mobility level indicated by the performance indicator 232 breaching (e.g., being greater than) the target mobility level (e.g., the mobility threshold) defined by the characteristic indicator 212a. In some implementations, the anomaly synthesizer 240 synthesizes the anomaly indicator 242 in response to a data throughput indicated by the performance indicator 232 breaching (e.g., being greater than) the target data throughput (e.g., the data throughput threshold) defined by the characteristic indicator 212a. In some implementations, the anomaly synthesizer 240 synthesizes the anomaly indicator 242 in response to a communication type indicated by the performance indicator 232 breaching (e.g., being different from) the target communication type(s) defined by the characteristic indicator 212a. In some implementations, the anomaly synthesizer 240 synthesizes the anomaly indicator 242 in response to a number/frequency of communications indicated by the performance indicator 232 breaching (e.g., exceeding) the target number/frequency of communications (e.g., communication number/frequency threshold) defined by the characteristic indicator 212a. In some implementations, the anomaly synthesizer 240 synthesizes the anomaly indicator 242 in response to a direction of communication indicated by the performance indicator 232 breaching (e.g., being different from) the target direction of communication defined by the characteristic indicator 212a. In various implementations, the anomaly synthesizer 240 synthesizes the anomaly indicator 242 in response to a device operation indicated by the performance indicator 232 breaching (e.g., being different from) a target operation (e.g., a threshold operation) defined by the characteristic indicator 212a.

In some implementations, the anomaly detector 200 (e.g., the anomaly synthesizer 240) transmits the anomaly indicator 242 to one of the devices 22 (e.g., to the refrigerator 22c). In some implementations, the anomaly detector 200 transmits the anomaly indicator 242 to an operating entity that controls operation of at least a portion of the cellular network 70. In some implementations, the anomaly detector 200 transmits the anomaly indicator 242 to a network/system administration device (e.g., a network/system administration computer that controls operation of the devices 22).

As illustrated in FIG. 2, in some implementations, the anomaly detector 200 (e.g., the anomaly synthesizer 240) generates and transmits a command 244 to the refrigerator 22c. In some implementations, the command 244 limits an operation of the refrigerator 22c. For example, in some implementations, the command 244 deactivates the refrigerator 22c, so that the refrigerator 22c is unable to communicate with the cellular network 70. In some implementations, the command 244 quarantines the refrigerator 22c, so that communications transmitted by the refrigerator 22c are not processed by the cellular network 70. In some implementations, the command 244 shuts down (e.g., powersdown) the refrigerator 22c. In some implementations, the command 244 causes the refrigerator 22c to download and execute computer-readable instructions corresponding to a security patch. More generally, in various implementations, the anomaly detector 200 (e.g., the anomaly synthesizer 240) generates and transmits the command 244 in order to limit an operation of one or more of the devices 22 that are associated with the performance indicator 232 in response to the performance indicator 232 breaching a corresponding one of the characteristic indicators 212a, 212b . . . 212n.

Figure 3:
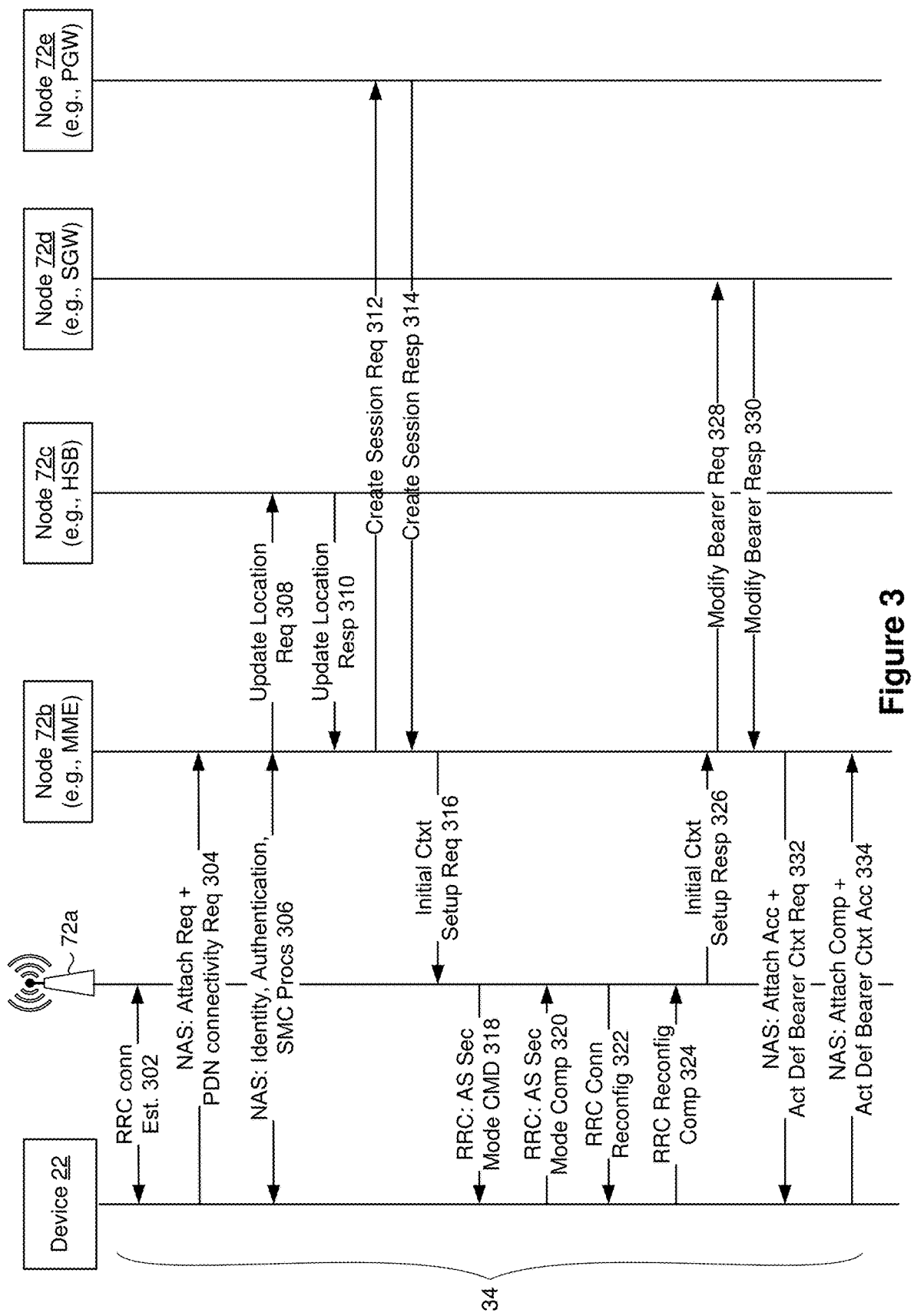
FIG. 3 is a sequence diagram illustrating radio resource control (RRC) messages being exchanged in accordance with some implementations.

FIG. 3 is a sequence diagram illustrating various RRC and NAS messages 34 being exchanged in accordance with some implementations. In some implementations, the anomaly detector 200 (e.g., characteristic determiner 210) utilizes one or more of the RRC and NAS messages 34 to determine the characteristic indicators 212a, 212b . . . 212n. In the example of FIG. 3, the RRC and NAS messages 34 corresponds to a RRC exchange. As illustrated in FIG. 3, in some implementations, the RRC and NAS messages 34 include messages related to:

RRC connection establishment 302;
NAS attach request and/or packet data network (PDN) connectivity request 304;
NAS identity, authentication, security mode command (SMC) procedures 306;
update location request 308;
update location response 310;
create session request 312;
create session response 314;
initial context setup request 316;
AS security mode command 318;
AS security mode complete 320;
RRC connection reconfiguration 322;
RRC reconfiguration complete 324;
initial context setup response 326;
modify bearer request 328;
modify bearer response 330;
NAS attach acc and/or act def bearer context request 332; and
NAS attach complete and/or act def bearer context acc 334.

In the example of FIG. 3, some of the RRC and NAS messages 34 include messages between the device 22 and one of the cellular network nodes 72a (e.g., eNB), 72b (e.g., MME), 72c (e.g., home subscriber base (HSB), 72d (e.g., serving gateway (SGW)) and 72e (e.g., packet gateway (PGW)), while other RRC and NAS messages 34 includes messages exchanged between the cellular network nodes 72a, 72b, 72c, 72d and 72e.

Figure 4:
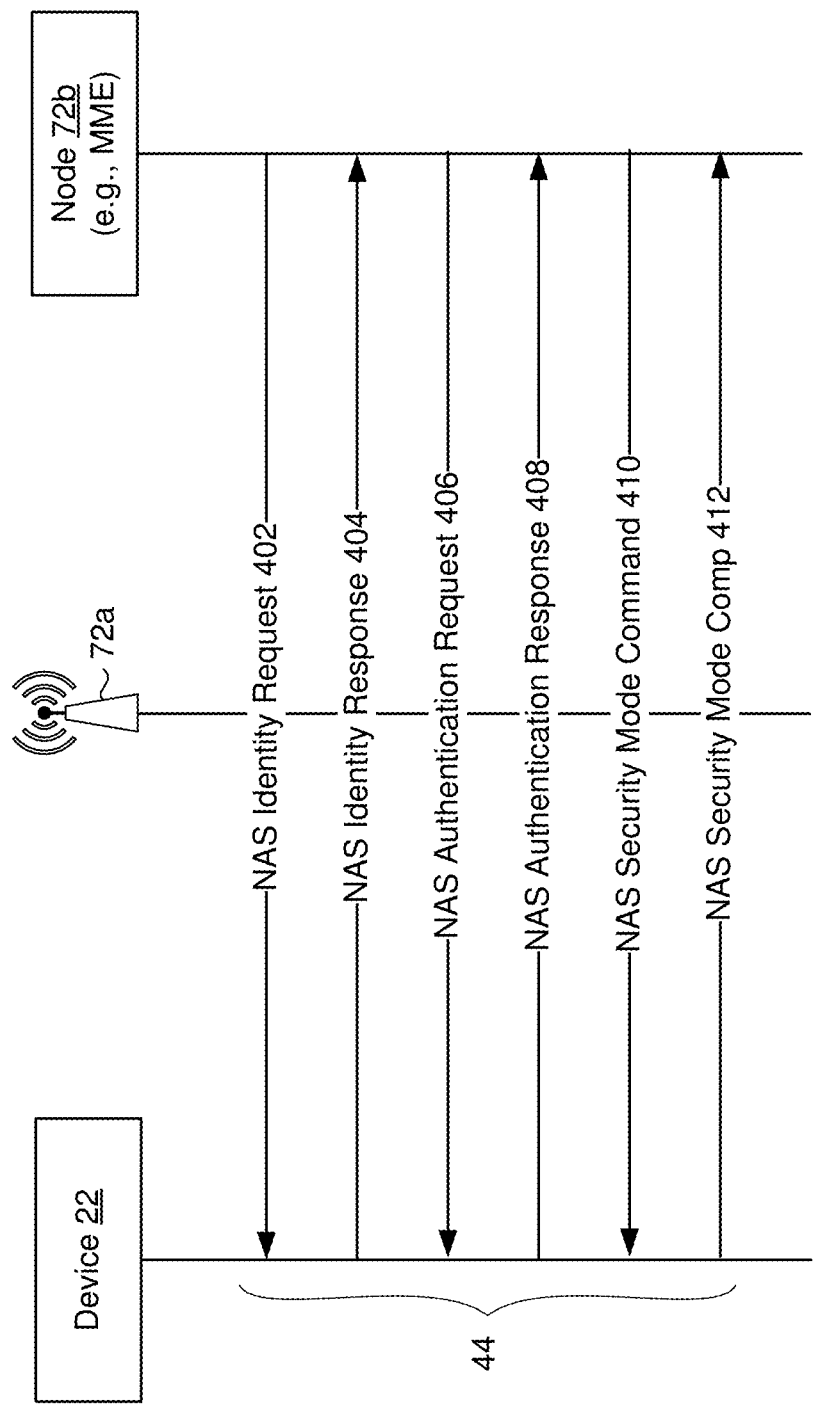
FIG. 4 is a sequence diagram illustrating non-access stratum (NAS) messages being exchanged in accordance with some implementations.

FIG. 4 is a sequence diagram illustrating non-access stratum (NAS) messages 44 being exchanged in accordance with some implementations. In some implementations, the anomaly detector 200 (e.g., characteristic determiner 210) utilizes one or more of the NAS messages 44 to determine the characteristic indicators 212a, 212b . . . 212n. In the example of FIG. 4, the NAS messages 44 corresponds to a NAS exchange. As illustrated in FIG. 4, in some implementations, the NAS messages 44 include messages related to:

NAS identity request 402;
NAS identity response 404;
NAS authentication request 406;
NAS authentication response 408;
NAS security mode command 410; and
NAS security mode complete 412.

In the example of FIG. 4, some of the NAS messages 44 include messages between the device 22 and the cellular network node 72b (e.g., MME).

Figure 5:
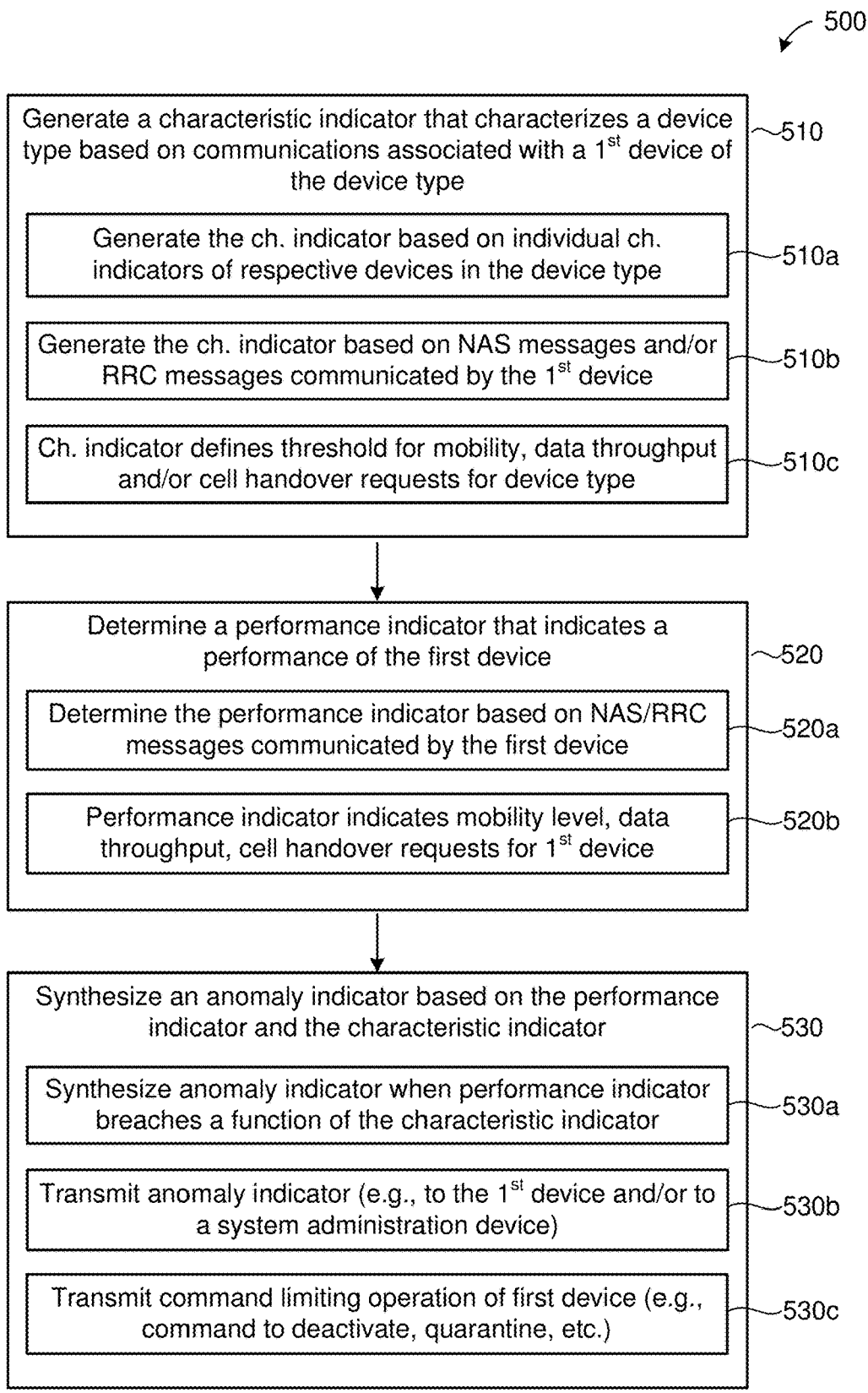
FIG. 5 is a flowchart representation of a method of identifying anomalies in accordance with some implementations.

FIG. 5 is a flowchart representation of a method 500 of identifying anomalies in accordance with some implementations. In various implementations, the method 500 is implemented as a set of computer readable instructions that are executed at an anomaly detector (e.g., the anomaly detector 200 shown in FIG. 2, and/or the anomaly detectors 74a, 74b . . . 74n shown in FIG. 1). Briefly, the method 500 includes generating a characteristic indicator that characterizes a device type based on communications associated with a first device of the device type, determining a performance indicator that indicates a performance of the first device, and synthesizing an anomaly indicator based on the performance indicator and the characteristic indicator.

As represented by block 510, in various implementations, the method 500 includes generating a characteristic indicator that characterizes a device type based on communications associated with a first device of the device type (e.g., the characteristic indicators 212a, 212b . . . 212n for device types 20a, 20b . . . 20n, respectively). As represented by block 510a, in some implementations, the method 500 includes generating the characteristic indicator based on individual characteristic indicators of respective devices in the device type (e.g., generating the characteristic indicator 212a based on individual characteristic indicators of the microwave 22a, the washing machine 22b and the refrigerator 22c shown in FIG. 1). As represented by block 510b, in some implementations, the method 500 includes generating the characteristic indicator based on NAS messages and/or RRC messages communication by the first device (e.g., as shown in FIGS. 3 and 4). As represented by block 510c, in some implementations, the method 500 includes generating a characteristic indicator that defines targets/thresholds for mobility, data throughput, types of communication, number/frequency of communications, and/or direction of communication. In some implementations, the method 500 includes updating the characteristic indicator based on additional messages communicated by the first device. As described herein, in various implementations, the method 500 includes generating the characteristic indicator by utilizing methods, devices and/or systems associated with machine learning. For example, in some implementations, the method 500 includes utilizing a learning agent (e.g., a distributed learning agent) to generate the characteristic indicator.

As represented by block 520, in various implementations, the method 500 includes determining a performance indicator (e.g., the performance indicator 232 shown in FIG. 2) that indicates a performance of the first device. In some implementations, the method 500 includes determining the performance indicator based on communications associated with the first device. For example, in some implementations, the method 500 includes determining the performance indicator based on messages transmitted/received by the first device. As represented by block 520a, in some implementations, the method 500 includes determining the performance indicator based on NAS/RRC messages communicated by the first device (e.g., the NAS/RRC messages shown in FIGS. 3 and 4). As represented by block 520b, in some implementations, the method 500 includes determining a performance indicator that indicates a mobility level, a data throughput, types of communications, number/frequency of communications, direction of communication associated with the first device.

As represented by block 530, in various implementations, the method 500 includes synthesizing an anomaly indicator (e.g., the anomaly indicator 242 shown in FIG. 2) based on the performance indicator and the characteristic indicator.

As represented by block 530a, in some implementations, the method 500 includes synthesizing the anomaly indicator in response to the performance indicator breaching a function of the characteristic indicator. For example, in some implementations, the method 500 includes synthesizing the anomaly indicator in response to the performance indicator being greater than the characteristic indicator. In some implementations, the method 500 includes synthesizing the anomaly indicator in response to a difference between the performance indicator and the characteristic indicator being greater than a threshold. As represented by block 530b, in some implementations, the method 500 includes transmitting the anomaly indicator. In some implementations, the method 500 includes transmitting the anomaly indicator to a network/system administration device (e.g., to an operator entity that controls at least a portion of the cellular network). As represented by block 530c, in some implementations, the method 500 includes transmitting a command (e.g., the command 244) to the first device. In some implementations, the command limits an operation of the first device (e.g., by deactivating/quarantining/shutting off the first device).

Figure 6:
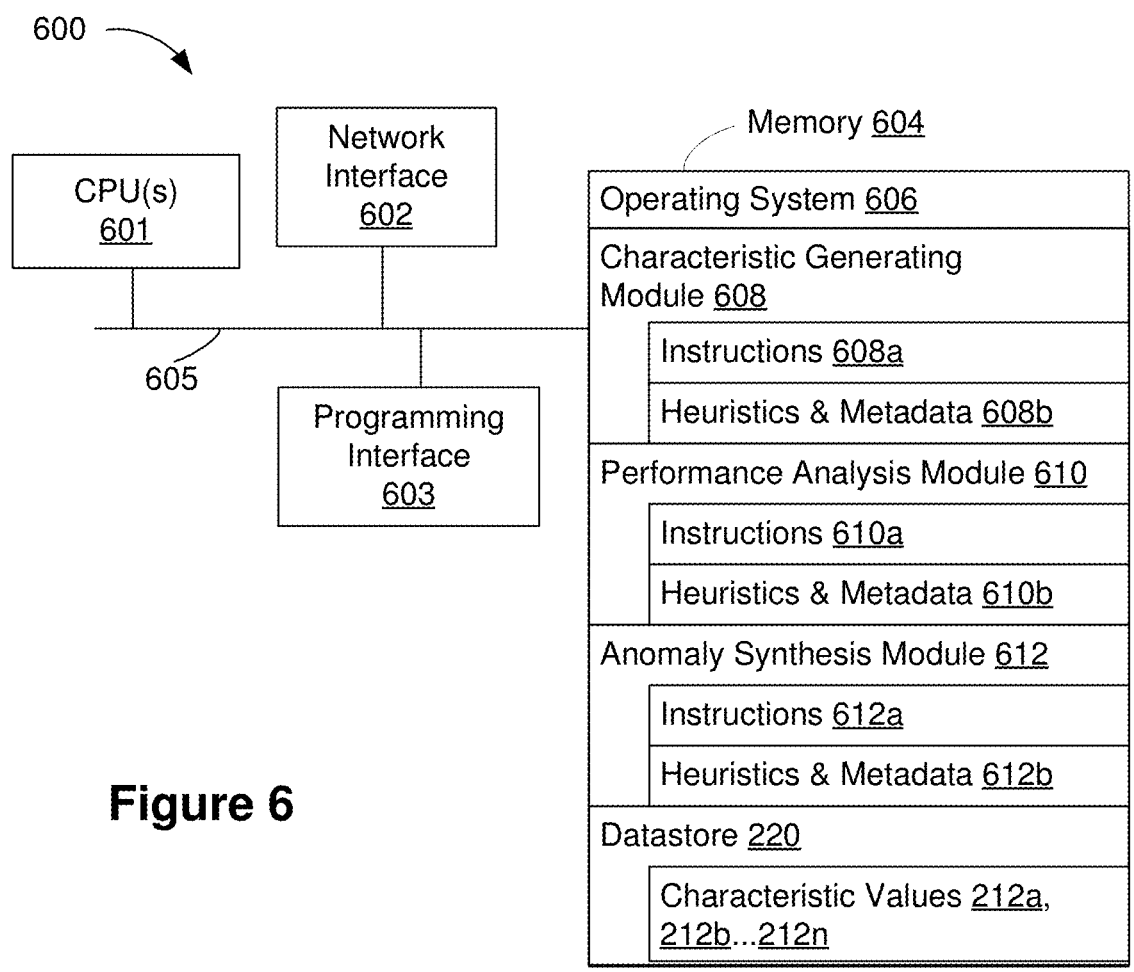
FIG. 6 is a block diagram of a server system enabled with various modules that are provided to identify anomalies in a network in accordance with some implementations.

FIG. 6 is a block diagram of a server system 600 enabled with one or more components of an anomaly detector (e.g., the anomaly detector 200 shown in FIG. 2 and/or the anomaly detectors 74a, 74b . . . 74n shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPUs) 601, a network interface 602, a programming interface 603, a memory 604, and one or more communication buses 605 for interconnecting these and various other components.

In some implementations, the network interface 602 is provided to, among other uses, establish and maintain a metadata tunnel between a cloud hosted network management system and at least one private network including one or more compliant devices. In some implementations, the communication buses 605 include circuitry that interconnects and controls communications between system components. The memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 604 optionally includes one or more storage devices remotely located from the CPU(s) 601. The memory 604 comprises a non-transitory computer readable storage medium.

In some implementations, the memory 604 or the non-transitory computer readable storage medium of the memory 604 stores the following programs, modules and data structures, or a subset thereof including an optional operating system 606, a characteristic generating module 608, a performance analysis module 610, an anomaly synthesis module 612, and the datastore 220. In various implementations, the characteristic generating module 608, the performance analysis module 610 and the anomaly synthesis module 612 perform substantially the same operations as the characteristic determiner 210, the performance analyzer 230 and the anomaly synthesizer 240, respectively, shown in FIG. 2. For example, in various implementations, the characteristic generating module 608 generates characteristic indicators for corresponding device types (e.g., the characteristic indicators 212a, 212b . . . 212n for the device types 20a, 20b . . . 20n, respectively). To that end, in various implementations, the characteristic generating module 608 includes instructions and/or logic 608a, and heuristics and metadata 608b. In some implementations, the characteristic generating module 608 stores the characteristic indicators 212a, 212b . . . 212n in the datastore 220. In some implementations, the performance analysis module 610 determines a performance indicator that indicates a performance of at least one device (e.g., the performance indicator 232 shown in FIG. 2). To that end, in various implementations, the performance analysis module 610 includes instructions and/or logic 610a, and heuristics and metadata 610b. In some implementations, the anomaly synthesis module 612 synthesizes an anomaly indicator (e.g., the anomaly indicator 242 shown in FIG. 2) based on the performance indicator and the characteristic indicator. To that end, in various implementations, the anomaly synthesis module 612 includes instructions and/or logic 612a, and heuristics and metadata 612b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
generating a characteristic indicator for a device type based on communications associated with a first device of the device type, wherein the characteristic indicator indicates at least one of a target threshold and a target communication type or communication direction for the device type;
determining, based on communications associated with the first device, a performance indicator for the first device; and
synthesizing an anomaly indicator in response to the performance indicator for the first device breaching at least one of the target threshold and the target communication type or communication direction for the device type.

2. The method of claim 1, wherein generating the characteristic indicator comprises:
generating the characteristic indicator for the device type based on individual characteristic indicators of respective devices in the device type.

3. The method of claim 2, wherein the characteristic indicator for the device type is an average of the individual characteristic indicators.

4. The method of claim 1, wherein the communications include one or more of non-access stratum (NAS) messages and radio resource control (RRC) messages.

5. The method of claim 1, wherein:
the characteristic indicator indicates that the target threshold corresponds to a target mobility level for the device type;
the performance indicator indicates a mobility level of the first device; and
synthesizing the anomaly indicator comprises synthesizing the anomaly indicator in response to the mobility level of the first device breaching the target mobility level for the device type.

6. The method of claim 1, wherein:
the characteristic indicator indicates that the target threshold corresponds to a target data throughput for the device type;
the performance indicator indicates a data throughput of the first device; and
synthesizing the anomaly indicator comprises synthesizing the anomaly indicator in response to the data throughput of the first device breaching the target data throughput for the device type.

7. The method of claim 1, wherein:
the characteristic indicator indicates that the target threshold corresponds to a target number of cell handover requests for the device type over a given period of time;
the performance indicator indicates a number of cell handover requests for the first device requested over the given period of time; and
synthesizing the anomaly indicator comprises synthesizing the anomaly indicator in response to the number of cell handover requests for the first device breaching the target number of cell handover requests for the device type.

8. One or more non-transitory computer readable storage media encoded with instructions that, when executed by a processor, cause the processor to perform operations, comprising:
generating a characteristic indicator for a device type based on communications associated with a first device of the device type, wherein the characteristic indicator indicates at least one of a target threshold and a target communication type or communication direction for the device type;
determining, based on communications associated with the first device, a performance indicator for the first device; and
synthesizing an anomaly indicator in response to the performance indicator for the first device breaching at least one of the target threshold and the target communication type or communication direction for the device type.

9. The one or more non-transitory computer readable storage media of claim 8, wherein generating the characteristic indicator comprises:
generating the characteristic indicator for the device type based on individual characteristic indicators of respective devices in the device type.

10. The one or more non-transitory computer readable storage media of claim 9, wherein the characteristic indicator for the device type is an average of the individual characteristic indicators.

11. The one or more non-transitory computer readable storage media of claim 8, wherein:
the characteristic indicator indicates that the target threshold corresponds to a target data throughput for the device type;
the performance indicator indicates a data throughput of the first device; and
synthesizing the anomaly indicator comprises synthesizing the anomaly indicator in response to the data throughput of the first device breaching the target data throughput for the device type.

12. An apparatus comprising:
a processor provided to execute computer readable instructions included on a non-transitory memory; and
a non-transitory memory including computer readable instructions, that when executed by the processor, cause the apparatus to:
generate a characteristic indicator for a device type based on communications associated with a first device of the device type, wherein the characteristic indicator indicates at least one of a target threshold and a target communication type or communication direction for the device type;
determine, based on communications associated with the first device, a performance indicator for the first device; and
synthesize an anomaly indicator in response to the performance indicator for the first device breaching at least one of the target threshold and the target communication type or communication direction for the device type.

13. The apparatus of claim 12, wherein synthesizing the anomaly indicator comprises:
transmitting the anomaly indicator.

14. The apparatus of claim 12, wherein synthesizing the anomaly indicator comprises:
transmitting a command that limits an operation of the first device.

15. The method of claim 1, wherein synthesizing the anomaly indicator comprises at least one of:
   transmitting the anomaly indicator; and
   transmitting a command that limits an operation of the first device.

16. The media of claim 8, wherein synthesizing the anomaly indicator comprises at least one of:
   transmitting the anomaly indicator; and
   transmitting a command that limits an operation of the first device.

17. The media of claim 8, wherein:
   the characteristic indicator indicates that the target threshold corresponds to a target data throughput for the device type;
   the performance indicator indicates a data throughput of the first device; and
   synthesizing the anomaly indicator comprises synthesizing the anomaly indicator in response to the data throughput of the first device breaching the target data throughput for the device type.

18. The media of claim 8, wherein:
   the characteristic indicator indicates that the target threshold corresponds to a target number of cell handover requests for the device type over a given period of time;
   the performance indicator indicates a number of cell handover requests for the first device requested over the given period of time; and
   synthesizing the anomaly indicator comprises synthesizing the anomaly indicator in response to the number of cell handover requests for the first device breaching the target number of cell handover requests for the device type.

19. The apparatus of claim 12, wherein:
   the characteristic indicator indicates the target threshold corresponds to a target data throughput for the device type;
   the performance indicator indicates a data throughput of the first device; and
   synthesizing the anomaly indicator comprises synthesizing the anomaly indicator in response to the data throughput of the first device breaching the target data throughput for the device type.

20. The apparatus of claim 12, wherein:
   the characteristic indicator indicates that the target threshold corresponds to a target number of cell handover requests for the device type over a given period of time;
   the performance indicator indicates a number of cell handover requests for the first device requested over the given period of time; and
   synthesizing the anomaly indicator comprises synthesizing the anomaly indicator in response to the number of cell handover requests for the first device breaching the target number of cell handover requests for the device type.

* * * * *